United States Patent
Verbrugge et al.

(10) Patent No.: US 8,919,100 B2
(45) Date of Patent: Dec. 30, 2014

(54) METHOD OF USING A REGENERATIVE BRAKE SYSTEM FOR HEATING A MOTOR VEHICLE CATALYTIC CONVERTER AND POWERING OTHER ELECTRICAL ACCESSORIES

(75) Inventors: Mark W. Verbrugge, Troy, MI (US); Karthik Ramanathan, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 666 days.

(21) Appl. No.: 13/153,534

(22) Filed: Jun. 6, 2011

(65) Prior Publication Data

US 2012/0304622 A1 Dec. 6, 2012

(51) Int. Cl.

| | | |
|---|---|---|
| *F01N 3/00* | (2006.01) | |
| *B60W 10/30* | (2006.01) | |
| *B60W 20/00* | (2006.01) | |
| *B60W 30/18* | (2012.01) | |
| *F01N 3/20* | (2006.01) | |
| *F02D 41/02* | (2006.01) | |
| *F02D 41/12* | (2006.01) | |

(52) U.S. Cl.
CPC ............. *B60W 10/30* (2013.01); *B60W 20/00* (2013.01); *B60W 30/18127* (2013.01); *F01N 3/2013* (2013.01); *F02D 41/024* (2013.01); *B60Y 2300/474* (2013.01); *F01N 2250/02* (2013.01); *B60Y 2300/92* (2013.01); *F02D 41/12* (2013.01); *Y02T 10/26* (2013.01)
USPC ................... 60/286; 60/285; 60/300; 60/274

(58) Field of Classification Search
CPC ..... Y02T 10/40; Y02T 10/48; Y02T 10/6286; Y02T 10/7044; F02D 2250/18; F01N 9/00; F01N 3/027; F01N 2240/16; F01N 3/026; F01N 3/26; F01N 3/025; F01N 2013/026; F01N 13/02; F01N 2330/02; F02B 3/06
USPC .................... 60/285, 286, 300, 303, 273, 274
See application file for complete search history.

(56) References Cited

U.S. PATENT DOCUMENTS

| | | | | |
|---|---|---|---|---|
| 5,323,607 A | * | 6/1994 | Tanaka et al. | 60/274 |
| 5,345,761 A | * | 9/1994 | King et al. | 60/274 |
| 5,428,955 A | * | 7/1995 | Yuuki et al. | 60/276 |
| 5,703,472 A | * | 12/1997 | Aoyama et al. | 322/28 |
| 5,763,977 A | * | 6/1998 | Shimasaki et al. | 310/191 |

(Continued)

FOREIGN PATENT DOCUMENTS

| | | | | |
|---|---|---|---|---|
| EP | 1239127 A1 | * | 9/2002 | |
| FR | 2927360 A1 | * | 8/2009 | F01N 3/20 |

(Continued)

OTHER PUBLICATIONS

Machine Translation of JP 2009-214703, Translated on Jan. 21, 2014.*

Primary Examiner — Thomas Denion
Assistant Examiner — Patrick Maines
(74) *Attorney, Agent, or Firm* — Reising Ethington P.C.

(57) ABSTRACT

A method for a motor vehicle includes using a regenerative brake system that produces electric current as a result of application of said regenerative brakes and sending at least a fraction of the electric current directly to an electrical accessory of the vehicle and bypassing the battery. One electrical accessory may be an electrically heated catalytic converter.

6 Claims, 2 Drawing Sheets

(56) References Cited

U.S. PATENT DOCUMENTS

| | | |
|---|---|---|
| 6,381,955 B1 * | 5/2002 | Morganti et al. ............... 60/300 |
| 2007/0295544 A1 | 12/2007 | Borroni-Bird et al. |
| 2008/0282673 A1 * | 11/2008 | Gonze et al. .................... 60/284 |
| 2009/0118886 A1 | 5/2009 | Tamai et al. |
| 2009/0118887 A1 | 5/2009 | Minarcin et al. |
| 2009/0118888 A1 | 5/2009 | Minarcin et al. |
| 2010/0094511 A1 | 4/2010 | Krueger et al. |
| 2011/0015812 A1 | 1/2011 | Vogel |
| 2011/0035136 A1 * | 2/2011 | Niimi ........................... 701/110 |

FOREIGN PATENT DOCUMENTS

| | | | | |
|---|---|---|---|---|
| JP | 11200851 A | * | 7/1999 | ............... F01N 3/24 |
| JP | 2004245135 A | * | 9/2004 | ............... F01N 3/02 |
| JP | 2007327481 A | * | 12/2007 | |
| JP | 2009214703 A | * | 9/2009 | |

* cited by examiner

METHOD OF USING A REGENERATIVE BRAKE SYSTEM FOR HEATING A MOTOR VEHICLE CATALYTIC CONVERTER AND POWERING OTHER ELECTRICAL ACCESSORIES

TECHNICAL FIELD

This invention relates to a system that heats a catalytic converter or powers other vehicle electrical accessories by using electric current produced by a regenerative brake system

BACKGROUND OF THE INVENTION

Regenerative brakes slow down or stop a motor vehicle by converting the kinetic energy of the vehicle in the form of motion into electrical energy by use of an electric motor/generator run in the generator mode. The generator mode is commenced when a vehicle operator applies the brake pedal. A brake controller senses the amount of pedal depression and then sends an input message to a motor controller as to how much regenerative braking is needed. In other words, a braking control request is initiated. The motor controller responds via voltage control to command the motor/generator to be in the generator mode i.e. regenerative braking and produce electrical energy as opposed to the propulsion mode. This produced electrical energy in the form of an electric current is normally used to recharge the vehicle battery.

Use of braking energy to recharge the motor vehicle battery is a great improvement of energy management compared to conventional frictional brakes which merely convert the kinetic energy of the motor vehicle into heat that is dissipated into the atmosphere, i.e. the energy turned into heat by frictional brakes is wasted. However, round trip energy losses are still associated with re-charging the vehicle battery merely to immediately discharge the battery to provide electrical energy elsewhere in the vehicle. Furthermore, unnecessary amp hour (Ah) i.e. amount of electric charge throughput shortens the life of the battery.

Various environmental emission regulations are also applicable to motor vehicles, whether the vehicles are powered by battery, internal combustion engines or a hybrid of both. One way for a vehicle incorporating an internal combustion engine to meet emission requirements is by directing its exhaust emissions through a catalytic converter. Catalytic converters, whether they be for gasoline engines or for diesel engines and whether they be a three-way catalyst, diesel oxidation catalyst or a lean $NO_x$ trap, work most efficiently when they are heated to a certain minimum temperature, i.e. its light-off temperature. As used herein, we use the term catalytic converter in a generic sense for all types of differently constructed catalytic converters.

Motor vehicles powered solely by a combustion engine will quickly warm up the catalytic converter from its cold start condition and keep it hot at its light-off temperature during most of the vehicle's operation to reduce the undesirable emissions. However, hybrid vehicles that run on both electric motors and internal combustion engines pose a more complicated problem. The internal combustion engine is only intermittently used. Often the internal combustion engine is not used when the electric motor is powering the vehicle. Thus, the catalytic converter also is only intermittently used and cools off between usage periods. Thus, the catalytic converter may be used for a substantial fraction of its use at below light-off temperatures as it repeatedly returns to its cold-start conditions. For some vehicles, such as extended range electric vehicles or plug-in hybrid electric vehicles, the internal combustion engine may not come on for the initial miles traveled by the vehicle.

It is desirable that the catalytic converter in a hybrid vehicle be pre-heated in order for it to function at its light-off temperatures or higher than light-off temperatures during the intermittent use of the combustion engine. It is known to connect electrically heated catalytic converters (EHC) to the vehicle battery to pre-heat the catalytic converter. However, such technology causes excessive recharging and dispensing of energy from the battery that reduces the life of the vehicle battery.

What is desired is a regenerative braking system that provides needed electrical energy directly to an electric consuming device, for example an electrically heated catalytic converter and bypassing the vehicle's battery.

SUMMARY OF THE INVENTION

A method of heating a catalytic converter for a motor vehicle includes providing a regenerative brake system that produces electric current as a result of application of the regenerative brakes. The regenerative brakes are controlled by a motor controller which senses, for example when the brake pedal is depressed. The brake controller senses the amount of pedal depression and sends an appropriate message to the motor controller. The motor controller in turn sends an appropriate command to a motor/generator that switches the motor/generator from a motor mode applying energy to the wheels, i.e. propulsion mode to a generator mode, i.e. regenerative brake mode that converts kinetic energy from the wheels into electric current. At least a fraction of the electric current is sent to an electric heater that is incorporated with the catalytic converter to heat the catalytic converter bypassing a battery in the motor vehicle.

Preferably, the fraction of electric current to be supplied to the catalytic converter is determined by comparing a predetermined reference temperature of the catalytic converter with a sensed temperature of the converter. A remaining fraction of electric current from the regenerative brake system is directed to a battery or other vehicular accessory. The fraction of electric current sent to the catalytic converter may also be determined by utilizing the state of health or state of charge of the battery and the converter temperature. The fraction of electric current sent to the catalytic converter can also be determined by one or more of the following variables from the group of engine speed, vehicle speed, converter life and ambient air temperature.

In one embodiment, the regenerative brake system is provided in an extended range electric vehicle and the fraction of electric current directed to the catalytic converter is determined in part by sensing of the charge level left in the battery. The electric current from the regenerative brake system is passed to the electrically heated catalytic converter when a charge level is sensed below a predetermined level.

In another aspect of the invention, a method of improving battery life and reducing Ah i.e. electric charge throughput in a battery for a motor vehicle includes providing a regenerative brake system that produces electric current as a result of application of the regenerative brakes. At least a fraction of the electric current is sent to an electrical accessory of the vehicle and bypassing the battery.

Preferably, the fraction of electric current bypassing the battery and supplied directly to the electrical accessory is determined by comparing a need for power consumption for the electrical accessory and directing a remaining fraction of electric current above the needed power consumption from the regenerative brake system to the battery or other vehicular accessory.

BRIEF DESCRIPTION OF THE DRAWINGS

Reference now is made to the accompanying drawings in which.

DESCRIPTION OF PREFERRED EMBODIMENTS

Figure 1:
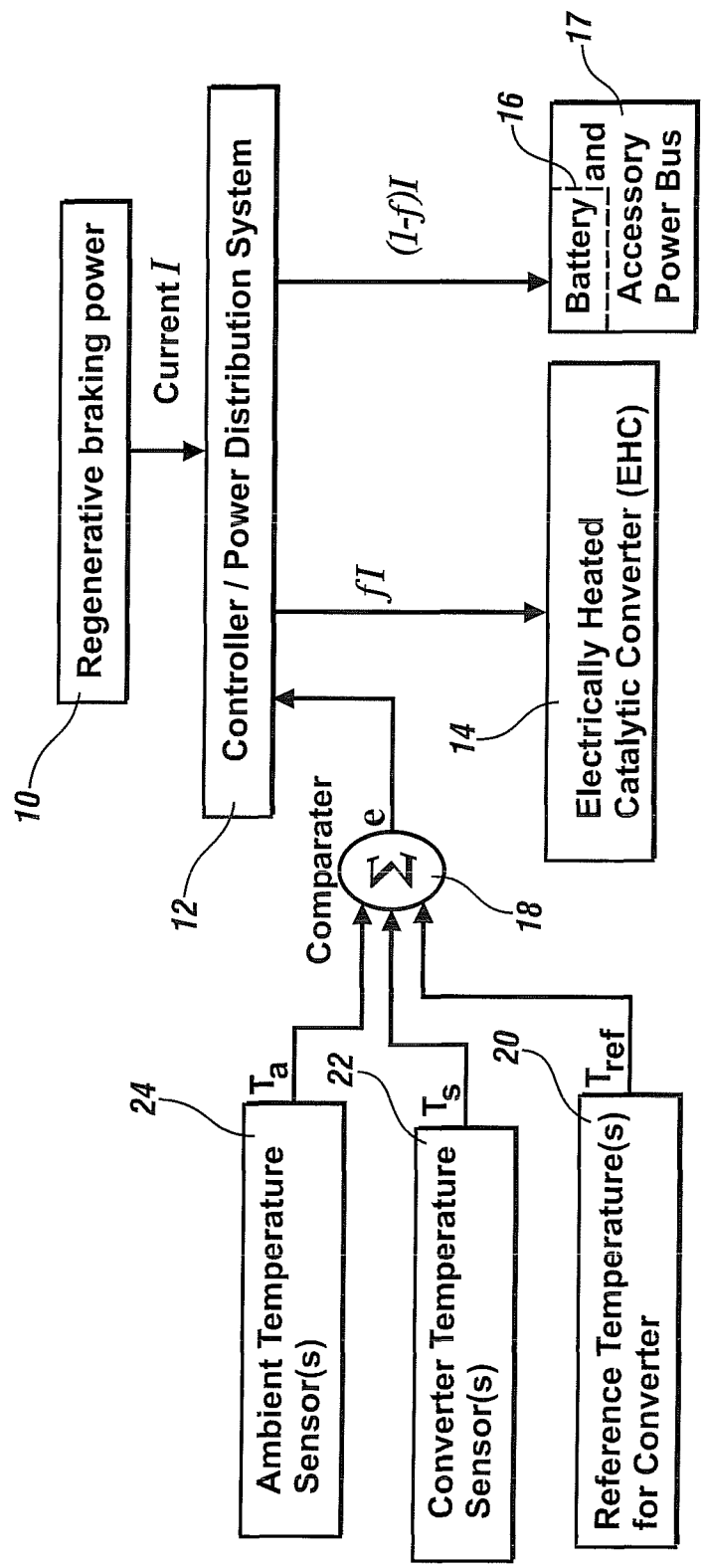
FIG. 1 is a flow chart schematically disclosing the regenerative brakes producing a current I during braking power passing to a controller and a fraction of the total electric current $fI$ being directed to an electrically heated catalytic converter (EHC)

Referring now to FIG. 1, regenerative brake system 10 is activated when an operator applies the brake pedal. A brake controller also referred to as a controller/power distribution system 12 senses the amount of pedal depression and sends a message to a motor controller that in turn sends an appropriate control signal to a motor/generator that places the motor/generator in a generator mode, i.e. regenerative brake mode as opposed to a propulsion mode. When applied, the regenerative brakes produce regenerative braking power which in turn produces an electric current I that is passed to a controller/power distribution system 12. The power distribution system passes a fraction of the electric current fI directly to the electrically heated catalytic converter (EHC) 14. The remaining fraction of the current (1−f) I is directed to the battery 16 or other accessory via an accessory power bus 17.

The power distribution system can determine the fraction f by providing a comparator 18 that determines the difference between a predetermined reference temperature 20 for the converter with the actual temperature of the converter sensed by a convertor temperature sensor 22 to form an error factor e for input to the controller to calculate the fraction f. In other words $e=T_s-T_{ref}$. The error factor e may be a more complicated function utilizing the ambient air temperature from ambient temperature sensor 24 resulting in $e(T_s, T_{ref}, T_a)$. Other variables may also be used such as engine speed, or rpms, vehicle speed, converter life, state of health of battery, or state of charge of battery to determine error factor e.

The electrically heated catalytic converter may have a metal monolith construction such that is its own electrical conductor or heater.

Figure 2:
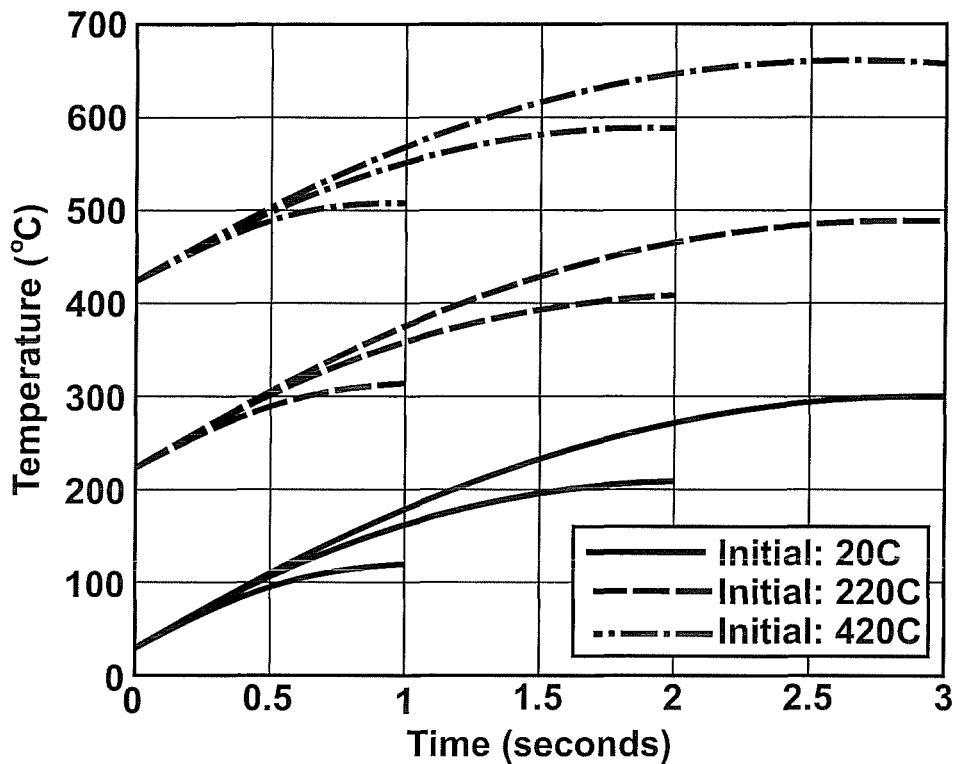
FIG. 2 is a chart illustrating modeling results for catalytic converter temperature increase due to application of 10 kW regenerative braking power at various initial catalytic converter temperatures for 1, 2, and 3 second time durations of the regenerative braking power.

Modeling results for application of 10 kW regenerative braking system is shown in FIG. 2 which shows braking applications of 1 second, 2 second and 3 second durations where the 10 kW regenerative braking power is ramped linearly down to 0 kW in the specified duration. For example, at an initial temperature of 20° C., one can see during a one second duration down to 0 kW, the modeled final temperature rose to above 100° C. A two second duration increased the final temperature to over 200° C. A three second duration produced a final temperature of almost 300° C. Similar increases in temperature for one, two and three second durations of regenerative linearly braking from 10 kW to 0 kW are also found at initial converter temperatures of 220° C. and 420° C.

Figure 3:
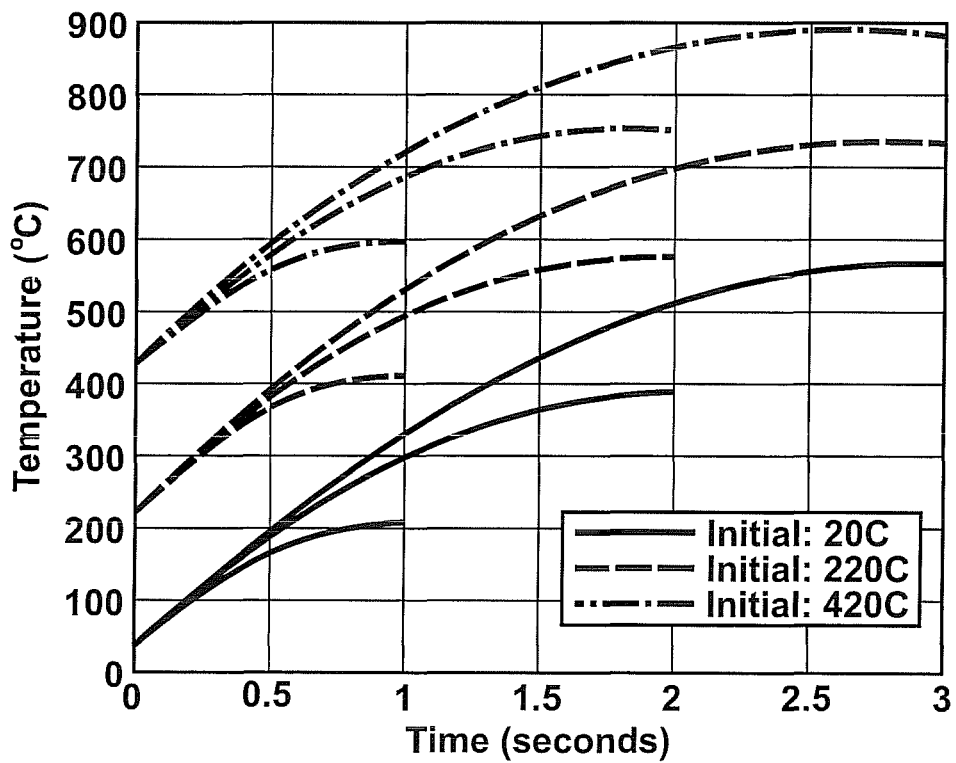
FIG. 3 is a chart similar to FIG. 2 illustrating modeling results for catalytic converter temperature increase due to application of 20 kW regenerative braking power at various initial catalytic converter temperatures for 1, 2 and 3 second time durations of the regenerative braking power.

While many present hybrid cars have smaller batteries that have only a limited charging rate, some larger batteries e.g. some presently in use in extended range electric vehicles can accept charge at now larger recharging rates. FIG. 3 shows modeling results for a larger 20 kW regenerative braking system that shows the same initial converter temperatures of 20° C., 220° C. and 420° C. The application of the 20 kW is initially generated and ramped linearly down to 0 kW in the duration specified. Significant increases in temperature are found for all one, two and three second applications at all three initial temperatures, of 20° C., 220° C. and 420° C.

This method of heating an electrically heated catalytic converter has application for a variety of hybrid electric vehicles. It helps maintain the catalytic converter at or closer to its light-off temperature to provide optimal operation of the catalytic converter. This direct electric heating of the catalytic converter has useful application for the intermittent use of the combustion engine in hybrid and plug-in hybrid vehicles.

A clear application is also found for extended range electric vehicles that only use the electric power source until it is discharged a certain amount at which time the internal combustion engine is used. The catalytic converter can be pre-heated for example when the sensors indicate that only a few miles are left for battery usage at which time the catalytic converter can then be pre-heated by use of the regenerative braking system and be ready when the internal combustion engine turns on. A sensor can detect the charge level of the battery and when the level is at or below a certain predetermined level, the regenerative braking energy can then be directed to the electrically heated catalytic converter.

A clear application can also be used for hybrid busses that undergo extensive stops during city traffic.

In this fashion, a reduction of unwanted emissions from the internal combustion engine is achieved with a low energy penalty by pre-heating the catalytic converter before the internal engine turns on. This application may be used to help achieve compliance with possibly more stringent future foreign and domestic governmental regulations that will restrict emissions during the cold-start periods for normal catalytic converters. Furthermore, by directly applying the regenerative braking power to the electrically heated catalytic converter, round trip energy losses are avoided thereby significantly cutting the total energy loss. For example regenerative braking energy directly to the battery results in a charging energy loss and then discharge from the battery to the electrically heated catalytic converter results in a discharge energy loss. With direct application of regenerative brake electric current to the electrically heated catalytic converter, this round trip double loss is avoided. Furthermore, needless Ah throughput of the battery is avoided thus improving the battery life of a hybrid vehicle.

In this fashion, larger regenerative braking systems can also be applied to vehicles because while batteries may now have only a limited recharging rate, the excess electric current of a regenerative battery system above the battery recharging rate can be applied to other accessories. Besides the electrically heated catalytic converter, other applications for example electric heaters for the passenger compartment when the weather is cold or electrically operated air conditioning units when the weather is hot can take advantage of the power supplied by a larger regenerative braking system. If one system cannot use the electric current produced by the regenerative braking system, the comparator can sense a second accessory that needs power and send the current directly to that accessory or the battery.

Other variations and modifications are possible without departing from the scope and spirit of the present invention as defined by the appended claims.

The embodiments in which an exclusive property or privilege is claimed are defined as follows:

1. A method of heating a catalytic converter for a motor vehicle comprising:
   providing a regenerative brake system in said motor vehicle for producing electric current as a result of application of said regenerative brake system; and
   sending at least a fraction of said electric current directly to an electric heater that is incorporated with said catalytic converter to heat said catalytic converter and bypassing a battery in said motor vehicle;
   having a controller determine said fraction of electric current to be supplied directly to the electric heater through a power distribution system by using one or more inputs and comparing said inputs with a respective predetermined referenced input and said power distribution system directing a remaining fraction of electric current from said regenerative brake system to said battery or an accessory power bus;
   determining said fraction of electric current to be supplied directly to the electric heater by determining an error factor (e) based on a reference input subtracted from an actual input; and
   said error factor being inputted into said controller.

2. The method as defined in claim 1 further comprising:
   determining said fraction of electric current to be supplied directly to the electric heater through said power distribution system by said error factor (e) being based on a reference temperature subtracted from an actual temperature of said catalytic converter and said power distribution system directing said remaining fraction of electric current from said regenerative brake system to said battery or an accessory power bus.

3. The method as defined in claim 2 further comprising:
   said error factor also utilizes ambient air temperature to calculate a fraction of electric current to be supplied directly to the electric heater.

4. The method as defined in claim 2 further comprising:
   said error factor also uses one of more of the following variables from the group of engine speed, vehicle speed, converter life, state of health and state of charge of the battery to calculate the fraction of electric current to be supplied from said power distribution system directly to the electric heater.

5. The method as defined in claim 1 further comprising:
   providing said regenerative brake system in an extended range electric vehicle; and
   determining said fraction of electric current through said power distribution system by sensing a charge level left in said battery and directing said fraction of electric current to said electric heater from said power distribution system when said charge level is below a certain predetermined level.

6. The method as defined in claim 1 wherein:
   said application of said regenerative brakes occurs upon brake pedal depression which is sensed by a brake controller which sends a message as to the amount of depression to a motor controller which then sends a command via voltage control to a motor/generator that places said motor/generator in a generator mode.

* * * * *